United States Patent [19]

Morin

[11] Patent Number: 4,905,787
[45] Date of Patent: Mar. 6, 1990

[54] REAR WHEEL DRIVE MECHANISM FOR A MOTORCYCLE

[76] Inventor: Gerard Morin, 259 Preston Lane, P.O. Box 1580, Timmons, Ontario, Canada, P4N 7W7

[21] Appl. No.: 287,864

[22] Filed: Dec. 21, 1988

[30] Foreign Application Priority Data

Nov. 28, 1988 [CA] Canada .................................. 584265

[51] Int. Cl.⁴ ........................ B62D 61/12; B62K 13/00
[52] U.S. Cl. .................... 180/209; 180/210; 180/215; 180/219; 475/253; 475/248
[58] Field of Search ............... 180/209, 210, 215, 219, 180/226; 74/710, 710.5

[56] References Cited

U.S. PATENT DOCUMENTS

| | | | |
|---|---|---|---|
| 1,271,553 | 7/1918 | Elliott | 180/16 |
| 1,309,305 | 7/1919 | Scheiner | 180/217 |
| 2,230,749 | 2/1941 | Herbert | 180/219 |
| 4,287,960 | 9/1981 | McConnell | 180/209 |
| 4,325,449 | 4/1982 | D'Addio et al. | 180/217 |
| 4,436,173 | 3/1984 | Takahashi | 180/226 |
| 4,561,518 | 12/1985 | Grinde | 180/215 |
| 4,593,782 | 6/1986 | Nobusawa et al. | 180/215 |
| 4,607,718 | 8/1986 | Nagataki et al. | 180/226 |
| 4,630,699 | 12/1986 | Yamada et al. | 180/209 |

FOREIGN PATENT DOCUMENTS

| | | |
|---|---|---|
| 718388 | 3/1942 | Fed. Rep. of Germany . |
| 756591 | 10/1953 | Fed. Rep. of Germany . |
| 754948 | 1/1954 | Fed. Rep. of Germany . |
| 911218 | 5/1954 | Fed. Rep. of Germany . |

*Primary Examiner*—Kenneth R. Rice
*Attorney, Agent, or Firm*—Stevens, Davis, Miller & Mosher

[57] ABSTRACT

A regular motorcycle, particularly of the type having a shaft driven rear wheel, is provided with a modified and simplified structure of a differential gear allowing a quick change from a single rear wheel mode to a double rear wheel mode, eliminating the need for an expensive differential gear lock mechanism and thus reducing the cost of production while at the same time simplifying the changeover from one mode to the other.

12 Claims, 4 Drawing Sheets

REAR WHEEL DRIVE MECHANISM FOR A MOTORCYCLE

The present invention relates to motorcycles and in particular to the conversion of a single rear wheel drive mode to a dual rear wheel drive mode of a motorcycle.

Motorcycles have lately become equipped with increasingly powerful engines. Many of the best selling motorcycles are heavy machines having engines with displacement often in excess of 1000 ccm. There is a tendency to utilize the high power of these large engines in custom modifications of the motorcycles. One of the most popular modifications is the conversion of a regular two wheel motorcycle to a three-wheel arrangement with both rear wheels disposed at a spacing from the centerline of the vehicle, i.e. a conversion into a motor tricycle.

The conversion to a tricycle is often hampered, and in certain cases even made entirely impossible, by the difficulties in providing a reliable and safe drive of the pair of rear wheels. A substantial care is often taken with respect to the appearance of the modified vehicle, at the expense of safety. The main problem is in that the heavy motorcycles of this type come with a standard, usually shaft-driven pinion/crown wheel drive which, while suitable and reliable in a single rear wheel mode, is not suitable for a dual wheel mode of the tricycles, wherein the wheels often turn at substantially different speed from each other. Thus, a solid rear axle, the most often used solution, provides very unstable behaviour of the vehicle when negotiating curves. Driving only one of the two wheels while leaving the other idle is not satisfactory either as the vehicle has different riding characteristics when negotiating a curve in one way from those experiencing in an oppositely directed curve.

It is obvious that the use of a differential gear or a similar mechanism presents an ideal solution. However, the conversion of the pinion/crown gear drive to differential gear presents a very substantial overhaul of the drive train of the vehicle which often makes it too expensive to convert the motorcycle to a dual rear wheel mode. Another reason that mitigates against the differential gear of the standard type is the need for providing a locking mechanism for locking the differential when operating in a single rear wheel mode. The locking mechanism while known in the art, presents another space requirement additional to the requirement presented by the differential gear itself.

Due to the above difficulties, the manufacturers of heavy bikes prefer the use of the much simpler solution of a pinion driven crown wheel drive, leaving it up to the owner to decide whether he would like to have an expensive overhaul carried out. This has been the case for many years, even though it is well known e.g. from German Pat. No. 754,948 issued to Zündapp as early as in 1944, on an application filed in September, 1939, to provide a detachable sidecar drive of a motorcycle with a differential having self looking mechanism which is actuated by removal of the side car axle. Different ways of cumbersome double rear wheel drive are also known from other prior art reference, e.g. from U.S. Pat. Nos. 2,230,749 (Hebert); 1,309,305 (Scheiner); 1,271,553 (Elliott); and 4,325,449 (D'Addio et al.) and from German Pat. No. 718,388 (BMW). In summary, prior art represented by the above publications thus suffers either from an extreme complexity or from insufficient operativeness, in both cases combined with an expensive often permanent, overhaul of the original motorcycle.

It is an object of the present invention to provide an improvement in that the conversion from a single rear wheel drive to a dual rear wheel drive would be a relatively simple, quick-detachment, quick-attachment operation which would require minimum or no professional assistance and would enable a quick conversion from one mode to the other, while retaining the relative simplicity and thus relatively low cost of the existing motorcycle.

In general terms, the present invention provides a rear wheel drive mechanism for a motorcycle, adapted for a quick changeover from a single rear wheel mode to a double rear wheel mode, said mechanism including: a differential gear arrangement mounted in a casing and having an input portion including drive pinion means; a first output portion including first sun gear means having a first bore for connecting the first sun gear means to a first half axle; a second output portion including second sun gear means having a second bore for connecting the second sun gear means to a second half axle; said bores being coaxial and having an axis generally transverse to the axis of the drive pinion; said differential gear arrangement being so disposed that there is free space between the first bore and the second bore for passage of an axle complementary with both bores for interlocking engagement with both of the sun gear means; said casing being provided, at each output portion, with mounting means for securing to the housing and thus to the differential gear arrangement a respective half axle mechanism; a single gear drive axle including a first end portion complementary with the first bore for an interlocking arrangement therewith; an intermediate portion adapted to interlockingly engage the second bore when the first end portion is interlockingly engaged with the first bore; and a second end portion adapted to extend out of the casing and rotatably mounted in a drive axle housing, the second end portion including rear wheel attachment means for attaching a rear wheel of an associated motorcycle to the axle; a cap complementary with the mounting means at the first output portion to sealingly close the casing at the first output portion.

According to an important further feature of the invention, the mechanism further includes at least one, preferably two, half axle assemblies, each of which assemblies comprises: a half axle housing having a half axle rotatably secured therein; a quick-release half axle securement means operatively associated with said half axle housing for fixedly but quickly-releasably securing an inner end thereof to the casing at one of said output portions; said half axle having an inner end portion which protrudes beyond said inner end of the housing and is complementary with the bore of the associated sun gear means for a locking engagement therewith when the housing is secured to the casing; said half axle further having an outer end portion protruding from an outer end of the housing and including wheel mounting means for securement of a respective rear wheel to the half axle.

Preferably, the mounting means is complementary both with said cap and with said quick-release half axle securement means. It is also preferred that the mounting means be an outer thread provided on the outside of the casing generally concentrically with the bores of the sun gear means, the respective securement means being an inner thread complementary with said outer thread.

The invention will now be described by way of an exemplary embodiment with reference to the accompanying simplified, diagrammatic drawings which are out of scale an in which certain parts of the overall mechanism have been omitted for the sake of clarity.

Figure 1:
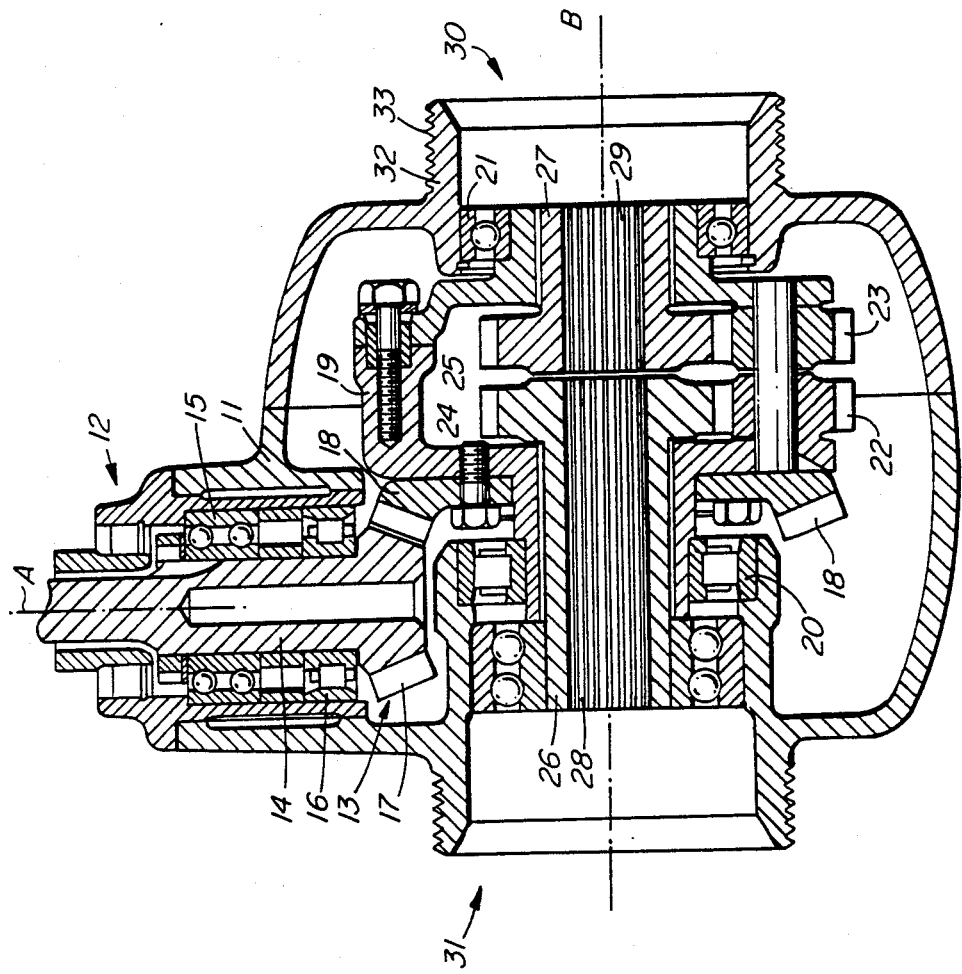
FIG. 1 is a simplified diagrammatic horizontal longitudinal sectional view shown in a partly exploded way, of a differential gear for use in the present invention.

Turning now to FIG. 1, a single wheel mode will first be described.

The motorcycle to which the arrangement is applied is provided with the usual rear drive wheel mechanism 10. The mechanism is arranged for a quick changeover from a single rear wheel mode to a double rear wheel mode as mentioned above. The mechanism includes a differential gear arrangement which is mounted in a casing 11. As is well known from the art of differential gears, the differential gear arrangement has an input portion 12 which is coaxial with a longitudinal axis A being generally the axis of a drive shaft of the motorcycle (the motorcycle not shown in FIG. 1). The input portion 12 includes, in the embodiment shown, drive pinion means 13 integral with a sleeve 14 mounted for rotation in a system of bearings 15, 16. The pinion itself is designated with reference number 17. As is well known, the pinion 17 is in a constant engagement with the teething of a crown wheel 18 to which is fixedly secured a differential cage 19. Thus, the crown gear 18 and the differential cage 19 rotate in common at all times. The arrangement is rotatable relative to the casing 11 in a bearing assembly which includes bearings 20 and 21. The bearings 20, 21 are coaxial with respect to a transverse axis which is designated with letter B.

The cage 19 supports pivotably system of satellite gears 22, 23. Even though not shown in the simplified drawings, there is one pair of satellite gears 22 and another pair of satellite gears 23, the gears of each pair being disposed at diametrically opposed sides of the axis B. The gears 22 and 23 are axially offset with respect to each other, along the axis B. Thus, the pair of satellite gears 23 is disposed to the right of the arrangement in FIG. 1 while the pair of gears 22 is on the left.

The satellite gears 22 are in a permanent mesh with a sun gear 24, while the opposed satellites 23 are in a permanent mesh with the sun gear 25, the latter being to the right of the former sun gear. The sun gears 24, 25 are each mounted for an independent mutual rotation within the casing as is well known in the art of differential gear mechanisms. The sun gears 24 and 25 are each provided with a sleeve which provides the means for rotatably mounting the satellites 24 relative to the casing 11 and also relative to the cage 19. The sleeve of the sun gear 24 is designated with reference number while the sleeve of the sun gear 25 is designated with reference number 27. Both sleeves 26 and 27 are coaxial with axis B. They are each provided with internal splines. The bore of the sleeve 26 having internal splines is designated with reference numeral 28, the bore of the sleeve 26 with reference numeral 29 (see FIG. 1). In the embodiment shown, the bores 28 and 29 provided with splines are coaxial bores of identical size and configuration.

Figure 2:
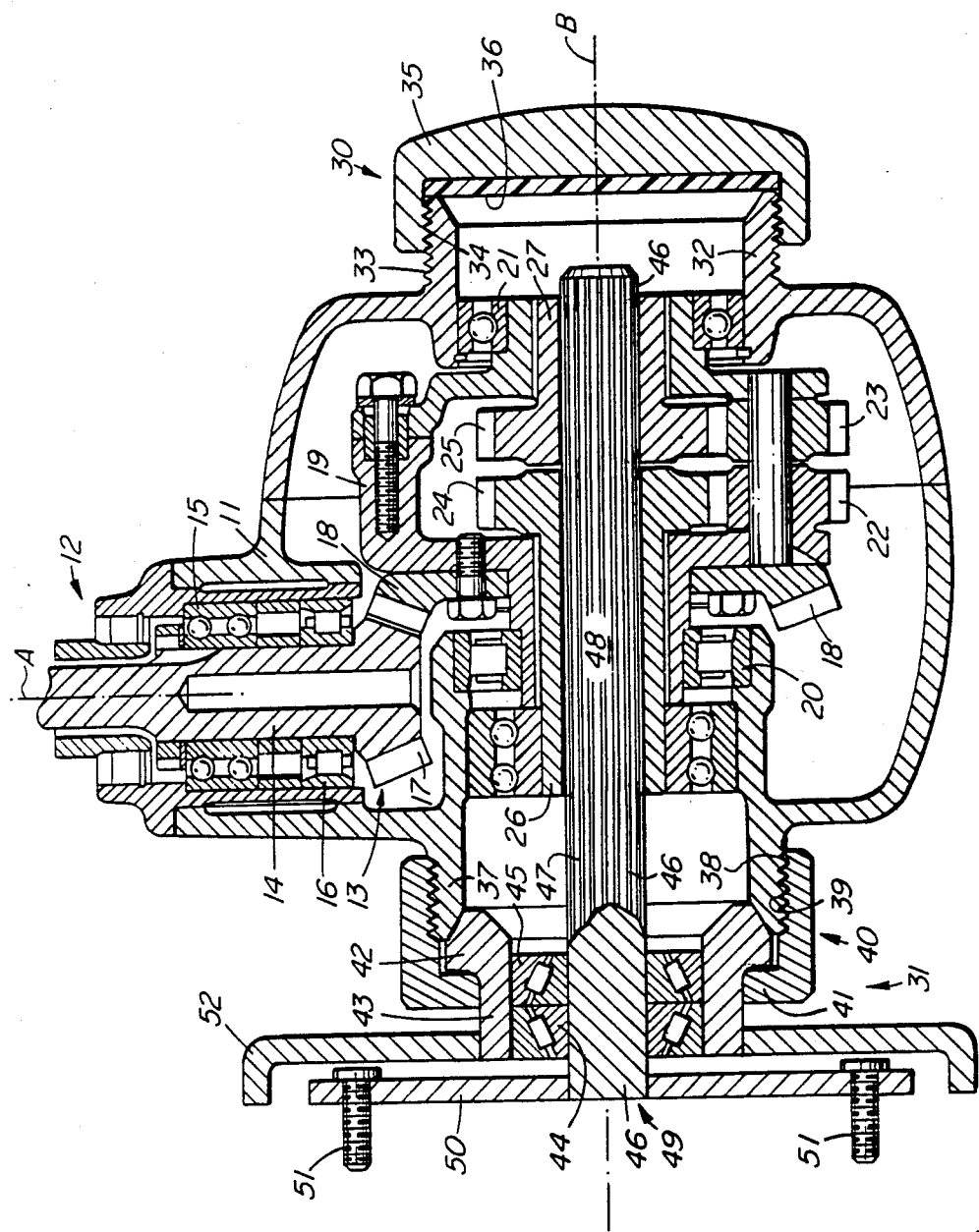
FIG. 2 is sectional view similar to that of FIG. 1 but showing the entire combination of the invention in a single rear wheel mode.
Figure 3:
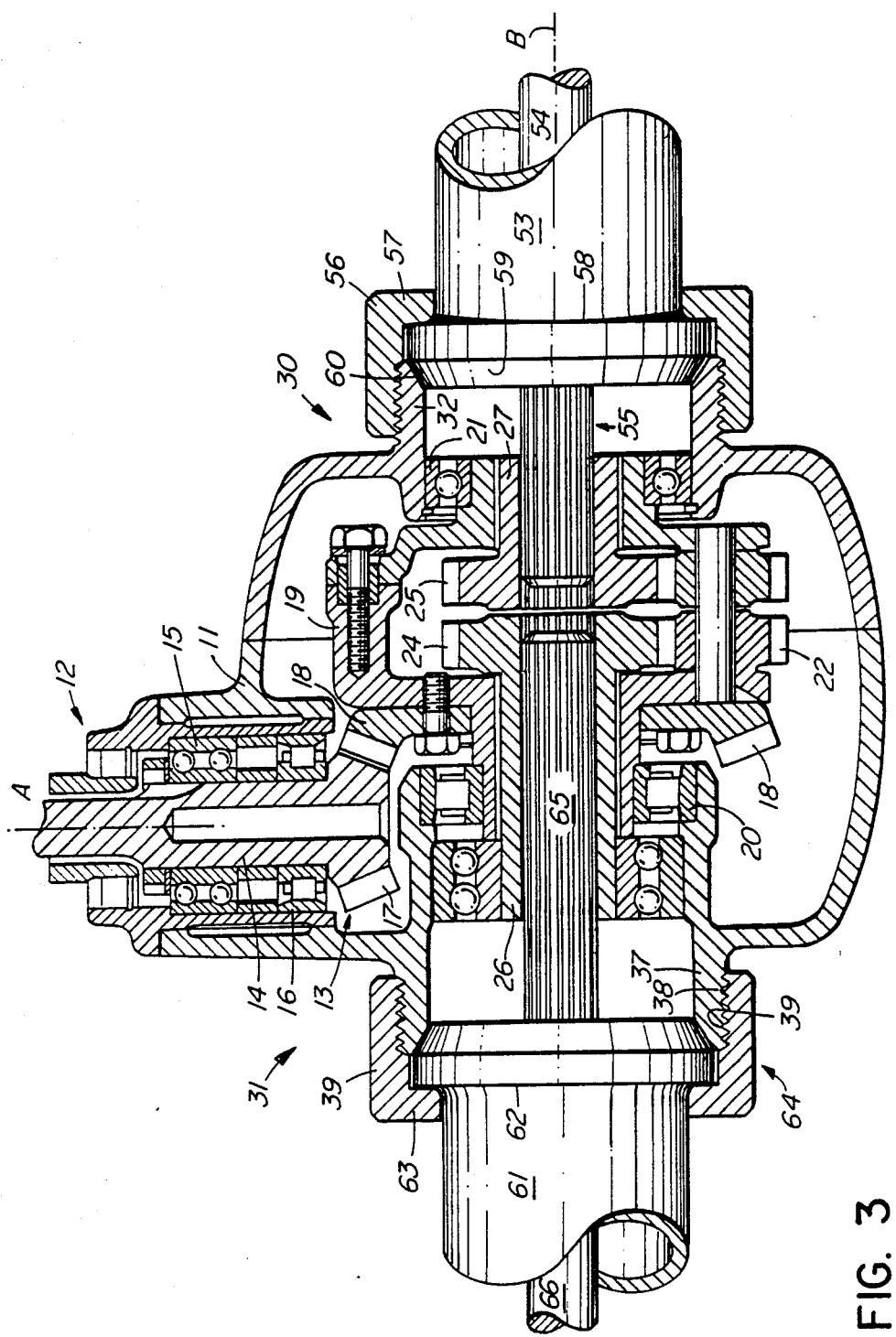
FIG. 3 is a sectional view similar to that of FIG. 1 but showing the arrangement in a dual rear wheel mode.

The sleeves 26 and 27 extend to the extreme left and right hand side, respectively, of the casing 11 as viewed in FIGS. 1–3. The right and left side of the casing 11 can also be referred to as a "first output portion 30" and a "second output portion 31", respectively, the latter being at the left hand side of the differential gear as shown in FIG. 1. From the standpoint of the above reference to the first and second output portions, the bore 29 having internal splines can be also referred to as "a first bore" while the bore 28 having internal splines can be referred to as "a second bore". It is also seen from FIG. 1 that the space between the bores 28, 29 is free of any obstructions. The free space is important for operation in the single rear wheel mode which will be described hereinafter.

The casing 11 is provided at the first output portion with an annular protrusion 32 which is provided with an outer thread 33. The protrusion 32 forms the extreme part of the first output portion 30. The thread 33 is compatible with an inner thread 34 of a cap 35 provided with a suitable gasket 36 (FIG. 2). Accordingly, the cap 35 can be tightly threaded on the protrusion 32 to sealingly close the first output portion 30, when desired.

At the opposite, second output portion 31, a similar annular protrusion 37 is provided with an outer thread 38. The thread 38 is compatible with the inner thread 39 of a mounting sleeve or union 40. The union 40 has an inwardly turned flange 41 compatible with an outwardly turned flange 42 of a tubular housing 43. The housing 43 has a drive axle pivotably mounted in a pair of bearings 44, 45. The drive axle is marked with reference number 46.

In the embodiment shown, the drive axle 46 is provided with external splines 47 compatible both with the internal splines of the second bore 28 and with the internal splines of the first bore 29. Accordingly, when the housing 43 is fixedly secured to the protrusion 37 of the casing 11, by the union 40 the axle 46 interengages the splines of the first bore 29 and at the same time the splines of the second bore 28 thus in effect interlocking the sun gears 24, 25 to lock the differential.

In the embodiment shown, the external splines of the axle 46 are continuous. However, the intermediate portion 48 of the axle 46 could be provided with a separate, different set of external splines, with the corresponding modification of the matching internal splines in the second bore 28. The free end portion of the axle 46 protruding from the bore 29 can also be referred to as a part of a "first end portion" which interlockingly engages the first sun gear 25. The opposite end portion, also referred to as second end portion 49 of the axle 46, is provided with wheel mounting means schematically represented by a disc 50 with securement means such as bolts, of which only two bolts 51 are shown, for securing to the axle 46 a rear wheel of the motorcycle, the wheel itself not being shown. A cover 52 may be provided and fixedly secured to the housing 43 to protect the arrangement of the disc 50 with bolts 51. Those skilled in the art will appreciate, of course, that the second end portion 49 of the axle 46 is normally of a much more complex arrangement as it has to include brake mechanism and other features which do not form a part of the present invention and therefore do not have to be shown.

Thus, with the arrangement shown in FIG. 1, the motorcycle is equipped with a differential gear but the differential gear is locked by simple insertion of the axle 46 through the two sun gears 24, 25.

The threads 33 and 34 as well as 38 and 39 provide an embodiment of a quick release of the entire housing 43 (and thus of the whole axle 46) for replacement with other parts as may be desirable.

It should be mentioned at this point that in the embodiments shown, the thread 38 (and its compatible thread 39) are both left hand threads, i.e. threads oriented in the direction of rotation of the flange 50 and thus the wheel of the motorcycle. On the other hand, the right hand side threads 33, 34 are regular right hand threads, also coincident with the direction of rotation of the rear wheel of the motorcycle.

Assuming now that it is desired to change the mode of the motorcycle from a single rear wheel mode to a double rear wheel mode wherein there would be one wheel to each side of the motorcycle at a generally equidistant spacing from the longitudinal center line of the motor bike, the union 40 and the cap 35 are both loosened from their respective protrusions 37, 32, whereupon the entire assembly of the axle 46 can be conveniently withdrawn from the casing 11. The cap 35 is removed also.

A set of two half axle assemblies is then provided for each output portion 30, 31 of the differential gear mechanism described.

Figure 4:
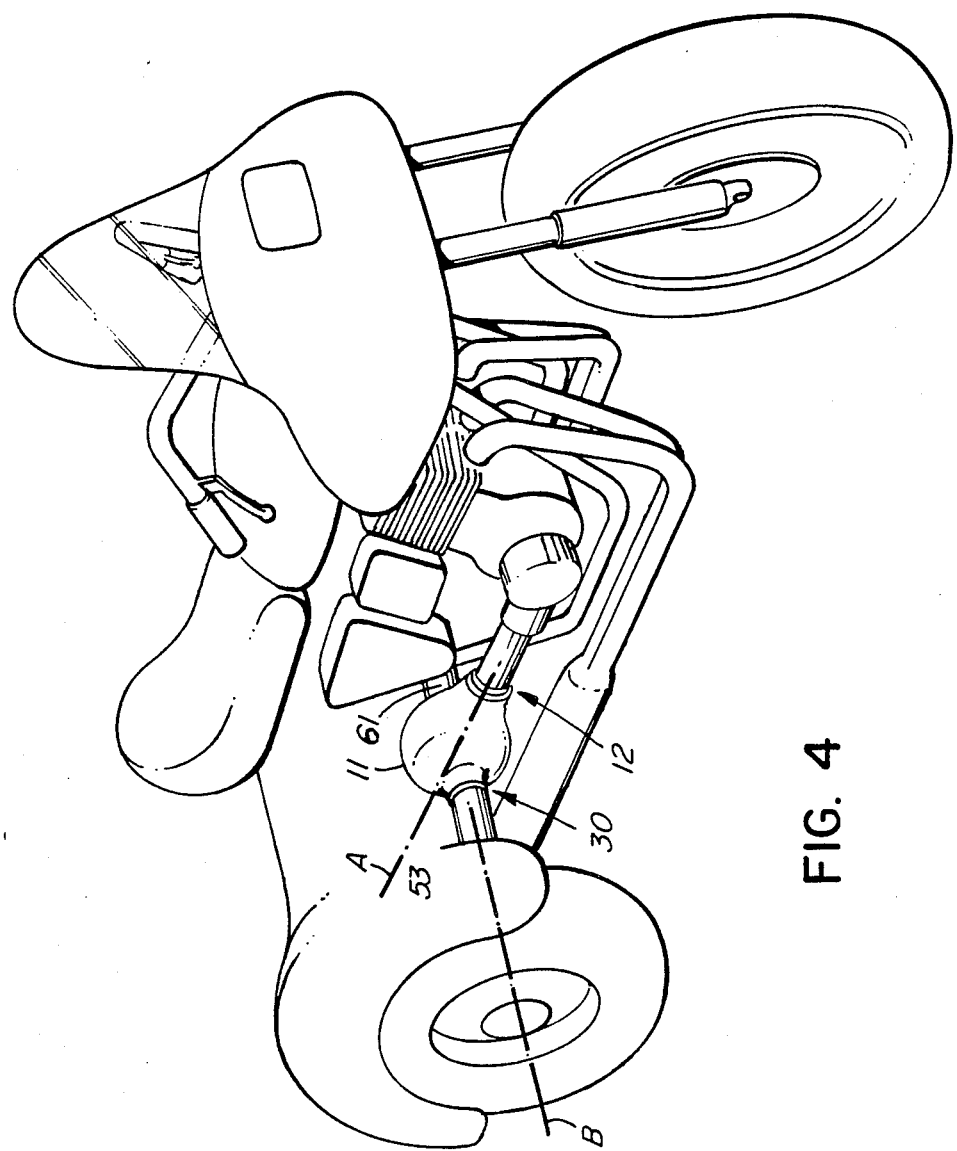
FIG. 4 is a diagrammatic perspective view indicating the overall arrangement of a modification of a motorcycle from a single wheel mode to a dual rear wheel mode.

Referring to FIG. 3 and FIG. 4, the cap 35 is replaced with a half axle housing 53 within which is rotatably secured, by means of bearings not shown in detail, a first half axle 54 whose inner end portion 55 is provided with external splines compatible with the splines of the first bore 29. The opposite end of the housing 53 and half axle 54 is provided with means (not shown in the drawings) for securement to the half axle 54 of one of the two rear wheels in a fashion similar to the left-hand end of the axle 46 as depicted in FIG. 1. A union 56 similar to the union 40 described above, has an internal thread 34 compatible with the thread 33 on the protrusion 32 of the housing 11. As in the first mentioned case, it has an inwardly turned flange 57 compatible with an outwardly turned flange or shoulder 58 of the housing 53. Accordingly, on tightening of the union 56 onto the housing 11 by thread 33, a conical face 59 of the housing 53 engages the concavely conical face of the housing 11 to sealingly engage the housing 53 with the interior of the casing 11 and to keep the inner end portion 55 in an interlocked arrangement with the first bore 29. Since the inner end portion 55 is relatively short. It is only long enough to engage the first bore 29, not the second bore 28. Accordingly, the first half axle 54 is now interlocked with the first sun gear 25.

Similarly, the second half axle housing 61 has a shoulder 62 engageable by an inwardly turned flange 63 of a union 64. The size and configuration of union 64 is identical with that of the union 40, inclusive of the inner thread 39. The tightening of the union 64 to the casing 11 brings the inner end portion 65 of the half axle 66 into engagement with the second sun gear 24.

It can be seen that the conversion from a single wheel drive of FIG. 1 to that of the arrangement indicated by FIGS. 3 and 4 is a matter of a simple release of one union and application of the other. Of course, auxiliary work such as securement of suspension, of additional body elements such as mud guards or the like has to be carried out as usual but the additional work is not as demanding on the skill of the person doing the changeover as the change of the vital drive portion.

Those skilled in the art will readily appreciate that many modifications can be made to the invention without departing from the scope of the present invention. For instance, the threaded annular protrusions 32 and 37 may be substituted by a flanged or other interlocking arrangement. The thread 38 can also be replaced by many other quick release mechanisms well known in the art. While the differential gear mechanism shown is preferred for its compact structure, it is known that many other mechanisms of differential gear system may exist which would fulfill basically the same function. Furthermore, it is not necessary to make the internal spline arrangement on the sleeves 26 and 27 of sun gears 24, 25 of the same kind. Rather, they may be of a different kind with an appropriate modification of the unitary drive axle 46.

Also, in the embodiment disclosed, a conversion is shown to a three wheel arrangement (double rear wheel) in which the wheels are both remote from the differential gear. This is not to say that the same principle could not be used by making one of the two half axles only very short, much in the fashion of the arrangement shown in FIG. 2 on the left hand side, but with the axle 48 shortened to the length appropriate to reach only into the sleeve 26 but not into sleeve 27 to render the differential operative while the cap 35 would be replaced with a "regular" size half axle mechanism including axle 54 and other arrangements described, to utilize the present invention for driving a side car. Of course, the shortened half axle would have to be shortened inside the gear as well to keep the sun gears independent of each other. In such modification, however, it mat be preferred to also use a different type of differential gear so designed and arranged that the torque at the wheel on the side car side is driven at a somewhat lower torque than that to which the rear wheel of the motorcycle is subjected.

The present invention, while described by way of modification of a regular motorcycle differential gear, can also be used in many other arrangements in which the parts of a differential gear mechanism, such as sun gear or satellite gears, are substituted by their mechanical equivalents. This is why certain elements of the invention are also referred to in general terminology such as "pinion means", "sun gear means" etc.

The above examples are but a few of possible modifications of the embodiment described, which do not depart from the present invention while they do differ from what has been disclosed above.

Accordingly, I wish to protect by letters patent which may issue on this application all such embodiments as properly fall within the scope of my contribution to the art.

The embodiments of the invention in which an exclusive right or privilege is claimed are defined as follows:

1. A rear wheel drive mechanism for a motorcycle, adapted for a quick changeover from a single rear wheel mode to a double rear wheel mode, said mechanism including:
 (a) a differential gear arrangement mounted in a casing, the gear arrangement together with the casing comprising:
  (i) an input portion including drive pinion means;
  (ii) a first output portion including first sun gear means having a first bore for connecting the first sun gear means to a first half axle;

(iii) a second output portion including second sun gear means having a second bore for connecting the second sun gear means to a second half axle;
(iv) said bores being coaxial and having an axis generally transverse to the axis of the drive pinion;
(v) there being a free space between the first bore and the second bore for passage from said second bore to the first bore of an axle complementary with both bores, for interlocking engaging with both of the sun gear means;
(vi) said casing being provided, at each output portion, with mounting means for securing to the housing and thus to the differential gear arrangement a respective half axle mechanism;
(b) a single gear drive axle including:
(i) a first end portion complementary with the first bore for an interlocking arrangement therewith;
(ii) an intermediate portion adapted to interlockingly engage the second bore when the first end portion is interlockingly engaged with the first bore; and
(iii) a second end portion adapted to extend out of the casing and rotatably mounted in a drive axle housing, the second end portion including rear wheel attachment means for attaching a rear wheel of an associated motorcycle to the axle;
(c) a cap complementary with the mounting means at the first output portion to sealingly close the casing at the first output portion.

2. The mechanism as claimed in claim 1, further including axle assembly which comprises:
(a) a half axle housing having a half axle rotatably secured therein;
(b) a quick-release half axle securement means operatively associated with said half axle housing for fixedly but quickly-releasably securing an inner end thereof to the casing at one of said output portions;
(c) said half axle having an inner end portion which protrudes beyond said inner end of the housing and is complementary with the bore of the associated sun gear means for a locking engagement therewith when the housing is secured to the casing;
(d) said half axle further having an outer end portion from an outer end of the housing and including wheel mounting means for securement of a respective rear wheel to the half axle.

3. The mechanism as claimed in claim 1, further including two half axle assemblies, each of which assemblies comprises:
(a) a half axle housing having a half axle rotatably secured therein;
(b) a quick-release half axle securement means operatively associated with the respective half axle housing at an inner end thereof for fixedly but quickly-releasably securing an inner end thereof to the casing at the respective one of said output portions;
(c) said half axle having an inner end portion which protrudes beyond said inner end of the respective housing and is complementary with the respective bore of the associated sun gear means for a looking engagement therewith when the respective housing is secured to the casing;
(d) said half axle further having an outer end portion protruding from an outer end of the housing and including wheel mounting means for securement of a respective rear wheel to the respective half axle.

4. The mechanism as claimed in claim 1, wherein said mounting means is complementary both with said cap and with said quick-release half axle securement means.

5. The mechanism as claimed in claim 4, wherein said mounting means is an outer thread provided on the outside of the casing, generally concentrically with the bores of the sun gear means, the respective securement means being an inner thread complementary with said outer thread.

6. The mechanism as claimed in claim 4, wherein said mounting means is of a generally identical size and shape at both output portions of the differential gear arrangement.

7. The mechanism as claimed in claim 6, wherein said mounting means is an outer thread provided on the outside surface of the casing, at each said output portion.

8. A rear wheel drive mechanism for a motorcycle, adapted for a quick changeover from a single rear wheel mode to a double rear wheel mode, said mechanism including:
(a) a differential gear arrangement mounted in a casing having an input portion including a drive pinion;
(b) a first output portion including first sun gear having a first bore with internal splines for connecting the first sun gear to a first half axle;
(c) a second output portion including second sun gear having a second bore with internal splines for connecting the second sun gear to a second half axle;
(d) said bores being coaxial and having an axis generally transverse to the axis of the drive pinion;
(e) said differential gear arrangement being so disposed that is free space between the first bore with internal splines and the second bore with internal splines for passage of a shaft complementary with both bores for interlocking engaging with both of the sun gear;
(f) said casing being provided, at the second output portion, with an external thread for securing to the casing and thus to the differential gear arrangement a single rear wheel drive mechanism, and at the first output portion with an external thread for securing to the casing a closure cap;
(g) said single rear wheel drive mechanism including a single gear drive axle including:
(i) a first end portion provided with external splines complementary with the internal splines of the first bore for an interlocking arrangement therewith;
(ii) an intermediate portion provided with splines complementary with the internal splines of the second bore for an interlocking arrangement therewith, whereby, with the single gear drive axle inserted in both bores, the sun gears are interlocked to lock the differential gear box; and
(iii) a second end portion adapted to extend out of the casing and rotatably mounted in a drive axle housing, the second end portion including rear wheel attachment means for attaching a rear wheel of an associated motorcycle to the axle;
(h) a first union complementary with a shoulder provided at an inner end of the drive axle housing, said union being provided with an inner thread corresponding to the thread on the casing at said second output portion thereof;
(i) said cap being provided with an internal thread complementary with the outer thread provided on the casing at said first output portion thereof to sealingly close the casing at the first output portion, when the associated motorcycle is in said single rear wheel mode.

9. The mechanism as claimed in claim 8, further including a half axle assembly which comprises:
   (a) a half axle housing having a half axle rotatably secured therein;
   (b) a quick-release half axle securement means operatively associated with said half axle housing for fixedly but quickly-releasably securing an inner end thereof to the casing at the first output portion, said securement means including a second union provided with an inner thread complementary with the outer thread on the casing at the first output portion thereof, the half axle housing being provided at the inner end thereof with a shoulder compatible with the second union;
   (c) said half axle having an inner end portion provided with external splines complementary with internal splines of first sun gear at said first output portion of the casing, said inner end portion protruding beyond said inner end of the housing and being complementary with the bore of the associated sun gear for a looking engagement therewith;
   (d) said half axle further having an outer end portion protruding from an outer end of the housing and including wheel mounting means for securement of a respective second rear wheel to the half axle.

10. The mechanism as claimed in claim 8, further including two half axle assemblies, each of which half-axle assemblies comprises:
   (a) a half axle housing having a respective half axle rotatably secured therein;
   (b) a quick-release half axle securement means operatively associated with the respective half axle housing for fixedly but quickly-releasably securing an inner end thereof to the casing at the respective one of said output portions, said securement means including a respective second union provided with an inner thread complementary with the outer thread on the casing at the respective output portion thereof, the half axle housing being provided at the inner end thereof with a shoulder compatible with the respective second union;
   (c) said half axle having an inner end portion provided with external splines complementary with the internal splines of the respective sun gear at the respective output portion of the casing, said inner end portion of the half axle protruding beyond said inner end of the housing and being complementary with the bore of the associated sun gear for a locking engagement therewith;
   (d) said half axle further having an outer end portion protruding from an outer end of the housing and including wheel mounting means for securement of a respective second rear wheel to the respective half axle.

11. The mechanism as claimed in claim 8, wherein the outer threads of the casing are complementary both with said cap and with said unions.

12. The mechanism as claimed in claim 11, wherein said threads are all of a generally identical size and type whereby only two said unions are required.

* * * * *